Nov. 18, 1969    J. M. AVIS ET AL    3,478,910
TILT MECHANISM FOR MAST ASSEMBLY
Filed Feb. 1, 1968    2 Sheets-Sheet 1

INVENTORS
JOHN M. AVIS.
HUGH H. DORMAN.
BY
SETTLE, BATCHELDER & OLTMAN.
ATT'YS.

Nov. 18, 1969     J. M. AVIS ET AL     3,478,910

TILT MECHANISM FOR MAST ASSEMBLY

Filed Feb. 1, 1968

INVENTORS
JOHN M. AVIS.
HUGH H. DORMAN.
BY
SETTLE, BATCHELDER & OLTMAN.
ATT'YS.

United States Patent Office 3,478,910
Patented Nov. 18, 1969

3,478,910
TILT MECHANISM FOR MAST ASSEMBLY
John M. Avis, Terre Haute, Ind., and Hugh H. Dorman, Huntington, N.Y., assignors to J. I. Case Company, Racine, Wis., a corporation of Wisconsin
Filed Feb. 1, 1968, Ser. No. 702,263
Int. Cl. B66f 9/08
U.S. Cl. 214—672
4 Claims

ABSTRACT OF THE DISCLOSURE

A vehicle having an article support assembly pivoted on a horizontal axis adjacent one end of the vehicle. The support assembly is pivoted on the horizontal axis through a control mechanism incorporating a vertical slide block having a fixed element carried by the assembly and a movable element connected to a pivoted link supported on the vehicle. The movable member in one embodiment is power driven through drive means interposed between the member and the support assembly while in another embodiment the member is moved along the slide by pivoting the link on the vehicle and providing drive means adjacent the vehicle end of the link.

BACKGROUND OF THE INVENTION

The present invention relates generally to industrial vehicles, such as forklifts, and more particularly to improved control mechanism for tilting a load support assembly with respect to a vehicle.

The use of industrial vehicles, such as powered forklifts, has been known for many years. Conventionally, the forklift includes a vehicle having a load supporting assembly or mast structure carrying a load engaging device with the mast structure being pivoted adjacent one end of the vehicle. For many years the tilting mechanism has included a pair of cylinder assemblies having one end secured to the vehicle and the opposite end secured to the mast so that extension and retraction of the cylinder assemblies will tilt the mast with respect to the vehicle.

Various proposals have been made for modifying this basic concept of controlling the tilt of a mast with respect to a vehicle. One such proposal is shown in Patent No. 2,114,165 issued to C. E. Cochran. This control mechanism does provide a less expensive arrangement than the dual control cylinder assemblies but has serious drawbacks in that the single cylinder control assembly as well as the dual cylinder control assemblies are very difficult to accurately control the amount of tilt of the mast with respect to the vehicle.

Of course, it goes without saying that the accurate control of the tilt or pivoting of the mast with respect to the vehicle is of extreme importance. This is particularly true in present day commercial vehicles in which the mast is generally formed of a plurality of sections and is capable of being expanded to a height of approximately 30 feet. Thus, in this type of mast structure it is mandatory that the mechanism be accurately controlled.

SUMMARY OF THE INVENTION

The present invention provides a simple and efficient control mechanism for pivoting a mast structure or load supporting assembly on a horizontal axis adjacent one end of the vehicle.

Generally speaking, the tilt mechanism of the present invention incorporates a guide track or slide means on the vertical axis of the mast structure which in turn slidably receives bracket means that are interconnected to the vehicle frame. In one embodiment of the invention, the bracket means are power driven along the slide means so as to tilt the mast structure in response to actuation of the drive means. Alternatively, the connection between the vehicle and the bracket supported on the mast may be in the form of a link pivoted intermediate its end with one end connected to the bracket means and the opposite end driven by a power mechanism.

Thus, the primary object of the present invention is to provide an improved control mechanism for tilting a load supporting assembly on an axis of a vehicle.

Another object of the present invention is to provide the control mechanism of the above type in which the control assembly is slidably connected to the mast structure so as to increase the accuracy of repositioning the mast with respect to the vehicle.

Other objects of this invention will appear in the following description and appended claims reference being had to the accompanying drawings forming a part of this specification wherein like reference characters designate corresponding parts in the several views.

AS SHOWN ON THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
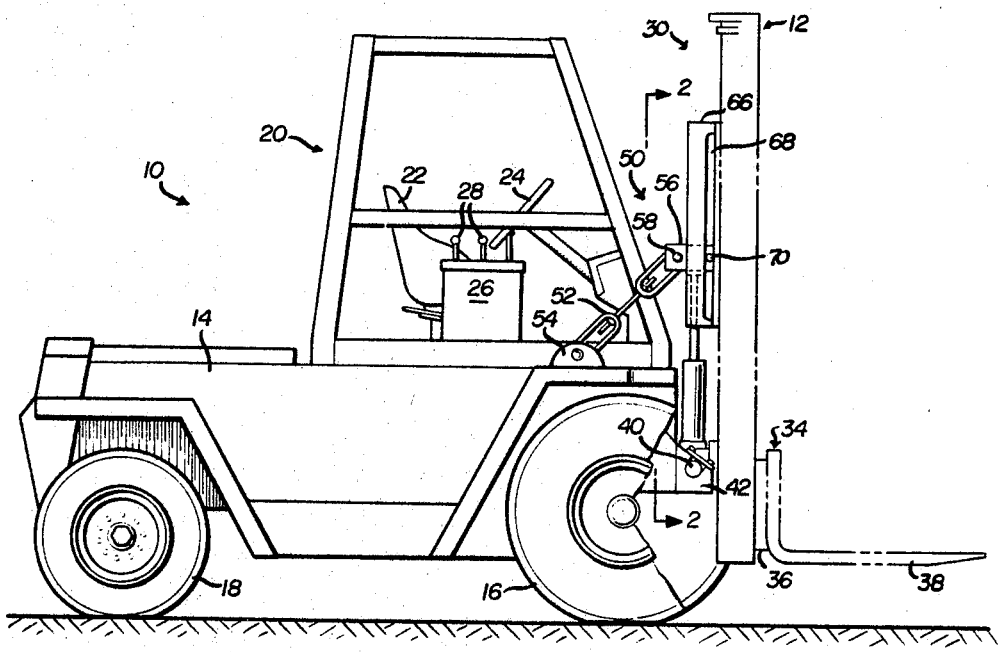
FIGURE 1 is a side elevational view of an industrial vehicle having the control mechanism of the invention incorporated therein.

With particular reference to FIGURE 1 of the drawings, the vehicle, generally designated at 10, has a load supporting assembly 12 attached to one end thereof. The vehicle 10 includes a body 14 supported on driven wheels 16 and steering wheels 18 (only one of each being shown). The body 14 also has a cab 20 supported thereon which surrounds the operator's compartment of the vehicle. The operator's compartment includes a seat 22, a steering mechanism 24 and control means 26 having individual control handles 28 adapted to operate various elements of the implement.

The load support assembly 12 includes a mast or guideway 30 having spaced vertically extending columns 32 adapted to guide a load supporting member 34 for vertical movement thereon. The load supporting member or carriage 34 has a frame structure 36 carried by the mast or the columns of the mast with adjustable fingers or tines 38 adapted to engage the load to be transported.

The load supporting assembly 12 is mounted adjacent one end of the vehicle for pivotal movement on a horizontal axis.

For this purpose, the vehicle has a shaft 40 carried on brackets 42 fixedly secured to the frame of the vehicle. The mast structure 30 includes a pair of spaced trunnions 44 which are received on the shaft 40 for rotational movement thereon.

According to the invention, improved means are provided for tilting the mast 30 on the shaft 40. The improved control mecahnism provides a simple and efficient means for accurately controlling the degree of tilt of the mast with respect to the transverse axis of the vehicle.

Figure 2:
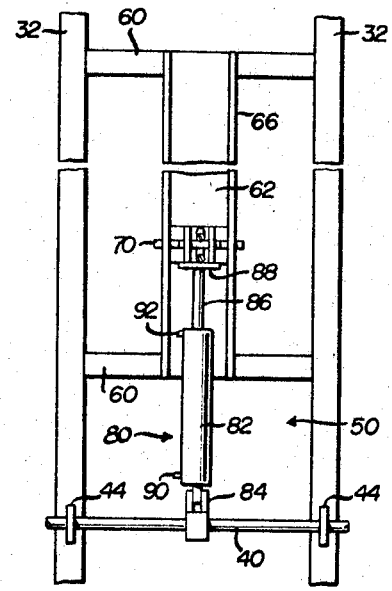
FIGURE 2 is a vertical sectional view taken generally along lines 2—2 of FIGURE 1.

As shown in FIGURES 1 and 2, the control mechanism 50 includes a turnbuckle 52 having one end fixedly secured to a lug 54 carried on the frame of the vehicle. The opposite end of the turnbuckle 52 is pivotally secured to bracket means 56 by a pin or bolt 58.

The bracket means 56 is slidably supported on the mast structure so that the connection between the mast structure and the turnbuckle or link 52 can readily be moved. For this purpose, the rear surface of the columns 32 support a pair of spaced plates 60 fixedly secured thereto by suitable means, not shown. The spaced plates 60 in turn support slide or guide means 62 which is illustratively shown as a channel member having the web of the channel secured to the respective plates 60. The respective legs 66 of the channel 64 are each provided with a longitudinally extending slot 68.

The bracket 56 has a pin 70 extending therethrough which is received in the respective slots 68. Thus, the bracket 56 is guided for vertical movement along the slots 68 formed on the mast structure.

Means are provided for driving or moving the bracket 56 with respect to the mast 30. In the illustrated embodiment, the drive means includes a fluid ram 80 in the form of a hydraulic cylinder 82 secured to a lug 84 carried by the shaft 40. The piston rod 86 of the cylinder assembly 80 has its free end secured at 88 to the bracket 56. Suitable fluid conduits (not shown) from the hydraulic power source of the vehicle may be attached to the respective fluid ports 90 and 92 so as to extend and retract the piston rod 86 within the cylinder 82 by applying pressure fluid to the appropriate ports 90 or 92.

Thus, it can readily be appreciated that the disclosed control mechanism provides an efficient and accurate means for controlling the degree of tilt of the mast on the vehicle. This is accomplished by vertically moving the bracket 56 on the slide means 62 by expansion or retraction of the cylinder assembly 80. Of course, the range of the tilt of the mast with respect to the vehicle upon expansion and retraction of the cylinder assembly can be varied with the turnbuckle connection 52 between the vehicle and the bracket 56.

Figure 3:
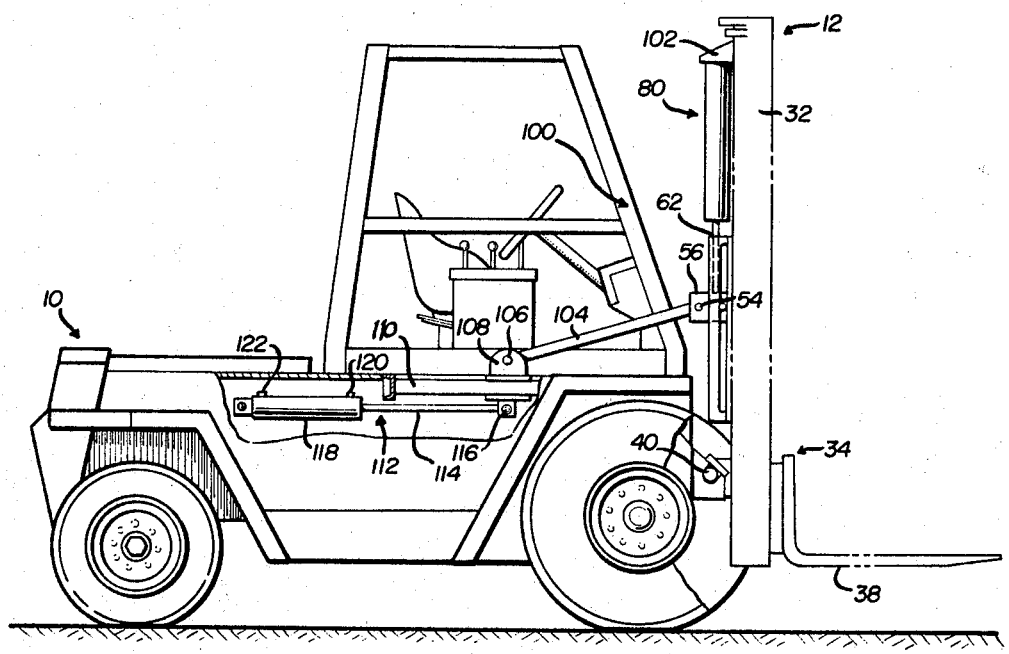
FIGURE 3 is a view similar to FIGURE 1 showing a modified control mechanism.

A slightly modified embodiment of the invention disclosed in FIGURES 1 and 2 is shown in FIGURE 3 and like reference numerals are utilized to indicate identical parts in the respective views. A modified control assembly 100 incorporates the same slide assembly 62 and the bracket means 56 as well as the cylinder assembly 80. However, in the modified embodiment the cylinder assembly is shown as being interconnected through a bracket 102 with the mast 30 at a point above the slide means or guide bracket 62.

In the control mechanism 100 the turnbuckle 52 is replaced with a fixed link 104 having one end connected through pin 54 to the bracket 56 with the opposite end connected by pin 106 to a slide bracket 108. The slide bracket 108 is guided for horizontal movement along the longitudinal axis of the vehicle on a track 110 fixedly secured to the frame of the vehicle. A second cylinder assembly 112 has its piston rod 114 connected through a pin 116 to the slide bracket 108. The cylinder 118 of the cylinder assembly 112 is suitably secured to the frame of the vehicle. Again pressured fluid is supplied to the respective ports 120 and 122 through suitable conduits (not shown) from the pressured hydraulic source of the vehicle.

It is believed that the operation of the embodiment shown in FIGURE 3 can readily be appreciated from the above description. Thus, extension and retraction of the cylinder assembly 112 will slide the bracket 108 along the track 110 to tilt the mast structure 30 on the vehicle 10. The more accurate degree of tilt of the mast can be performed by the second cylinder assembly 80 interposed between the mast structure and the bracket means 56. Of course, the combination of the two cylinder assemblies in the tilt control mechanism allows for a greater versatility in pivoting of the mast on the vehicle. Thus, for example a greater degree of tilt can be achieved by appropriate extension and retraction of the respective cylinder assemblies 80 and 112. This arrangement is particularly advantageous for moving the mast structure to what is commonly referred to as the "layback" position for transportation purposes.

It will be appreciated that retraction of both of the cylinder assemblies will tilt the mast structure 30 rearwardly towards the vehicle a considerable distance from the normal vertical position shown in FIGURE 3. Thus, for example, by appropriate selection of the size of the cylinders as well as the length of the slide bracket, the mast structure may be tilted approximately 50° from the normal vertical position shonw in FIGURE 3 so that the vehicle is capable of being passed through openings having limited height. This significant feature is of extreme importance in present day commercial vehicles which may necessarily be required to be moved into buildings having relatively low openings.

Figure 4:
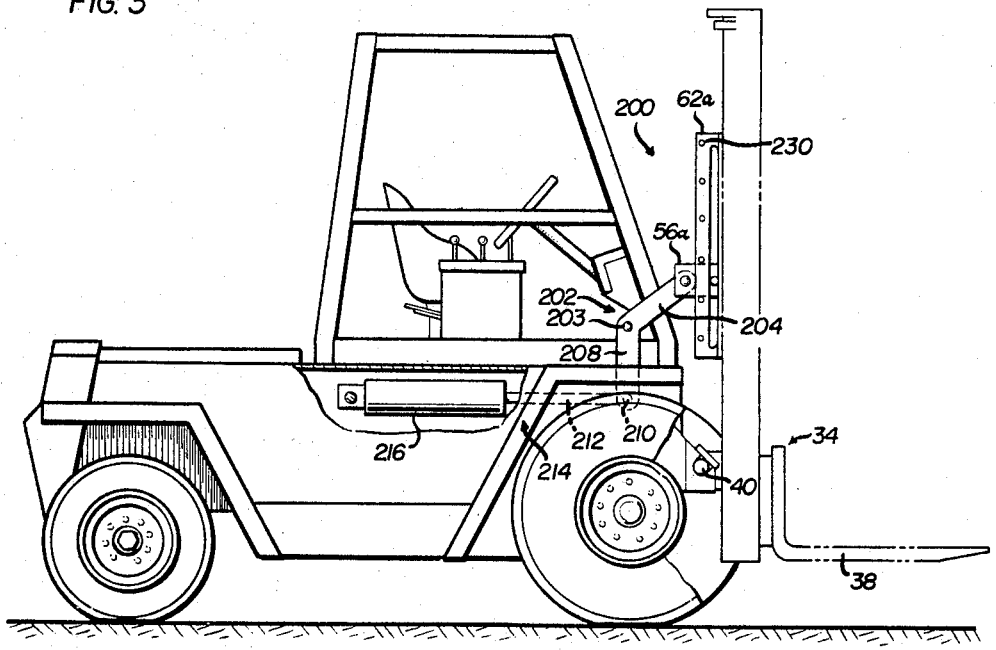
FIGURE 4 is a further modification of the control mechanism shown in FIGURE 1.

A still further modified embodiment of the invention is shown in FIGURE 4. The control mechanism 200 of FIGURE 4 includes a slide or guide track 62a connected to the mast structure 30 in substantially identical manner as that disclosed in the embodiment previously described. Likewise the bracket means 56a is substantially identical to the bracket means 56 previously described. In the embodiment illustrated in FIGURE 4, the means connecting the bracket 56a to the frame of the vehicle includes a bellcrank 202 pivoted intermediate its ends on a pin 203 carried by the vehicle. The first arm 204 of the bellcrank is pivotally connected to the bracket 56a while the second arm 208 of the bellcrank 202 is pivotally connected by a pin 210 to the piston rod 212 of the cylinder assembly 214. The cylinder 216 of the cylinder assembly 214 is pivotally secured to the frame of the vehicle. Thus, extension and retraction of the cylinder assembly 214 will pivot bellcrank 202 about pin 203 thereby sliding the bracket 56a along the slidetrack 62a to tilt the mast structure 30 on the shaft 40.

According to another aspect of the modified embodiment of the invention, means are provided for limiting the degree of tilt of the mast structure with respect to the vehicle. For this purpose, the legs of the channel forming the guide track 62a are provided with a plurality of vertically spaced aligned holes 230 adapted to receive pins so as to limit the sliding movement of the bracket 56a between spaced pins disposed in spaced openings 230. Of course, the stop means may be incorporated in any of the previous embodiments.

From the above description it can be appreciated that the invention provides a simple and efficient manner of accurately controlling the amount and degree of tilt of a mast structure with respect to a vehicle.

While several exemplary embodiments of the invention have been described in detail, it will be apparent to those skilled in the art that the disclosed embodiments may be modified.

We claim:

1. In a load handling vehicle having a frame, an elongate mast, support means on said frame supporting said mast at its lower end upon said frame for pivotal movement about a horizontal axis extending transversely of said vehicle, load elevating means on said mast, and tilting means coupled between said frame and said mast for pivotally positioning said mast upon support means; the improvement wherein said tilting means comprises a first guide means mounted upon and extending longitudinally of said mast in perpendicular relationship to said horizontal axis, second guide means mounted upon and extending longitudinally of said vehicle frame, a rigid link, means coupling the opposite ends of said link respectively to said first and said second guide means for sliding movement thereon and for pivotal movement relative to said guide means about axes parallel to said horizontal axis, first power means on said mast for slidably positioning the end of said link coupled to said first guide means longitudinally of said first guide means, and second power means on said vehicle frame operable independently of said first power means for slidably positioning the end of said link coupled to said second guide means longitudinally of said second guide means.

2. In a vehicle as defined in claim 1; the further improvement wherein said second guide means extends horizontally on said frame, and said first guide means extends along said mast from a lower end located below said second guide means to an upper end located substantially above said second guide means.

3. In a load handling vehicle having a frame, a mast, support means on said frame supporting said mast at its lower end upon said frame for pivotal movement about a horizontal axis extending transversely of said vehicle, load elevating means on said mast, and tilting means coupled between said frame and said mast for pivotally positioning said mast upon said support means; the improvement wherein said tilting means comprises a bracket mounted upon said mast for sliding movement along a fixed path on said mast normal to said horizontal axis, power means on said mast for positioning said bracket at selected locations on said fixed path, pivot means on said bracket defining a second axis of pivotal movement parallel to said horizontal axis, coupling means connected at one end to said pivot means for pivotal movement about said second axis and for movement along said fixed path with said bracket, means at the other end of said coupling means connecting said coupling means to a fixed point on said vehicle frame remote from said support means, and means in said coupling means for varying the distance between said fixed point on said frame and said second axis to thereby vary the angular displacement of said mast about said horizontal axis in response to a given linear displacement of said bracket along said fixed path by said power means.

4. In a vehicle as defined in claim 3; the further improvement wherein said means for varying the distance between said fixed point and said second axis comprises a second bracket mounted for sliding movement on said frame along a horizontal path extending longitudinally of said vehicle, hydraulic motor means connected at one end to said fixed point on said frame and connected at its other end to said second bracket to slidably position said second bracket along said fixed path on said frame at selected distances from said fixed point, and a rigid link pivotally connected at one end to said pivot means for pivotal movement about said second axis, and means connecting the other end of said rigid link to said second bracket for pivotal movement relative to said bracket about a third axis parallel to said second axis.

References Cited

UNITED STATES PATENTS

| 1,289,786 | 12/1918 | Ittner | 214—672 X |
| 1,440,155 | 12/1922 | Junkin | 298—22 |
| 2,867,341 | 1/1959 | Tieslov | 214—672 |
| 3,049,378 | 8/1962 | Nelson | 298—22 |
| 3,395,820 | 8/1968 | Mathew et al. | 214—671 |

FOREIGN PATENTS

| 31,091 | 12/1960 | Finland. |
| 931,579 | 8/1955 | Germany. |

GERALD M. FORLENZA, Primary Examiner

R. B. JOHNSON, Assistant Examiner